United States Patent Office 3,752,784
Patented Aug. 14, 1973

3,752,784
PROCESS FOR PREPARING MICROPOROUS OPEN-CELLED CELLULAR POLYMERIC STRUCTURES
Francis Edward Jenkins, Wilmington, Del., assignor to E. I. du Pont de Nemours and Company, Wilmington, Del.
No Drawing. Filed Dec. 23, 1970, Ser. No. 101,143
Int. Cl. C08f 45/30, 47/10; C08g 53/10
U.S. Cl. 260—2.5 R    24 Claims

ABSTRACT OF THE DISCLOSURE

A process for preparing microporous open-celled cellular polymeric structures which comprises (a) dissolving the starting polymer in a mixture comprising chlorofluorocarbon solvent and a cosolvent selected from methanol, ethanol, isopropanol, t-butanol, dimethylformamide, dimethylacetamide, dioxane, trioxane, dimethylsulfoxide, tetrahydrofuran, acetone, methylethyl ketone, hexamethyl phosphoramide, acetic acid, butyrolactone, N-methylpyrrolidone, pyridine, morpholine, methyl Cellosolve, ethyl Cellosolve, propyl Cellosolve and a mixture of any of said cosolvents to form a polymer solution; (b) adding water in the amount of at least 10 volume percent of the polymer solution thereto at a temperature below the atmospheric boiling point of the solvents but greater than 0° C.; (c) separating the resultant polymerchlorofluorocarbon phase; and (d) removing the chlorofluorocarbon from the separated polymer-chlorofluorocarbon phase.

BACKGROUND OF THE INVENTION

Field of the invention

This invention relates to a novel process for preparing microporous cellular polymeric structures and more particularly to a process for preparing open-celled microporous cellular structures of polymers in the presence of selected chlorofluorocarbon and a cosolvent selected from the group consisting of methanol, ethanol, isopropanol, t-butanol, dimethylformamide, dimethylacetamide, dioxane, trioxane, dimethylsulfoxide, tetrahydrofuran, acetone, methylethyl ketone, hexamethyl phosphoramide, acetic acid, butyrolactone, N-methylpyrrolidone, pyridine, morpholine, methyl Cellosolve, ethyl Cellosolve, propyl Cellosolve and a mixture of any of said cosolvents.

Prior art

Cellular polymeric structures are well known in the art and have found extensive use as insulating, construction, packaging materials and the like. Such cellular structures have been made from a variety of polymers, including polyurethanes, polystyrene, cellulose esters, and polyvinyl chloride.

A number of methods are available for the preparation of polymeric cellular structures. In one method, a molten thermoplastic polymeric material is thoroughly mixed with a gas or a volatile liquid at atmospheric pressure, and the mixture is heated in a closed chamber under pressure. The hot mixture is then released from the closed chamber through a suitable die or opening thus subjecting the hot mixture to the reduced pressure of the atmosphere causing the gas or the low boiling liquid to expand and volatilize, leaving a permanent cellular structure on cooling.

A second method, particularly applicable to the formation of polyurethane cellular structures, utilizes the heat of polymerization to create a cellular structure. In this "one-shot" technique, polyisocyanate, polyhydroxyl compounds, polymerization catalysts (e.g. amines) and blowing agents (e.g. $CCl_3F$, $CCl_2F_2$) are combined. As polyurethane formation takes place, the heat of polymerization causes the blowing agent to expand and volatilize leaving behind a cellular polyurethane structure.

In another method, molten thermoplastic polymer is thoroughly mixed with solids of finite size which after cooling are subsequently extracted from the polymer mass with selected solvents, leaving behind a cellular structure.

Still another method is to compact a powdered or granular polymer at a temperature slightly below its melting temperature, thus forming an interstitial polymer structure.

There are, however, various disadvantages manifested by these processes. Some processes, for instance, are suitable only for thermoplastic polymers which are stable in the molten state while others are applicable only to those condensation polymerization reactions which can be controlled—such technique cannot, for example, be generally used with those polymers which are formed by addition polymerization. The most apparent limitation of the prior art methods of forming cellular structure is the inability of each method to provide a broad variety of shapes of cellular materials.

The cellular material prepared by the above methods may be either closed-celled or open-celled depending on the particular process utilized. Closed-celled structures contain individual cells whose size and cell wall thickness depend upon such factors as molecular weight of the polymer, type of blowing agent used, and the density of the final cellular material. The open-celled structure does not contain individual cells but is characterized by the presence of interconnecting channels throughout the cellular structure. Closed-celled polymeric materials are especially suitable for those applications where the transmission of vapor would be undesirable, such as in thermal insulation. Open-celled polymeric materials, on the other hand, are especially suitable for those applications where transmission of vapor would be desirable. Microporous open-celled polymeric materials, such as certain polyurethanes have found acceptance as leather-like poromeric structures.

While closed-celled polymeric materials can be readily made by known methods of the art, open-celled polymeric structures are usually much more difficult to obtain. There is therefore a need for a reliable and convenient process for making open-celled polymeric materials of any desired shape and this need is satisfied by the process of the present invention.

SUMMARY OF THE INVENTION

The present invention is directed to a process for preparing microporous open-celled cellular polymeric structures.

The process comprises the following steps:

(a) At least 0.3 weight per volume percent of a normally solid polymer is dissolved in a homogeneous solvent mixture of from about 10 to about 75 volume per volume percent of a liquid chlorofluorocarbon solvent or mixture of chlorofluorocarbon solvents having a boiling point in the range of from about 10° C. to 150° C., a melting point in the range of from about −40° C. to 125° C. (melting point being lower than boiling point), an entropy of fusion of less than 10 calories/° K./mole (heat of fusion [cal./mole]/temperature of fusion [° K.]), a plastic flow index of at least 0.1 g./10 min. at the reduced temperature of 0.96 to 0.99 (reduced temperature equals T° K. at which flow measured/T° K. of melting point; plastic flow being a measurement of the rate of extrusion as measured on a plastometer according to ASTM–D 1238–65T) and a solubility in water of less than about 2 weight percent, and from about 90 to about 25 volume per volume percent of a cosolvent selected from the group consisting of methanol, ethanol, isopropanol, t-butanol, dimethylformamide, dimethylacetamide, dioxane, trioxane, dimethylsulfoxide, tetrahydrofuran, acetone, methylethyl ketone, hexamethyl phosphoramide, acetic acid, butyrolactone, N-methylpyrrolidone, pyridine, morpholine, methyl Cellosolve, ethyl Cellosolve, propyl Cellosolve, and mixtures of any of said cosolvents to form a polymer solution;

(b) Water is added to the resultant solution in an amount of at least 10 volume percent while the solution is at a temperature below the atmospheric boiling point of the lowest boiling of the chlorofluorocarbon solvents or selected cosolvents present but greater than 0° C., causing a polymer-chlorofluorocarbon phase and at least one other phase to form;

(c) The polymer-chlorofluorocarbon phase is then separated out; and (d) The chlorofluorocarbon is removed from the separated polymer-chlorofluorocarbon phase.

DESCRIPTION OF THE INVENTION

In the process of this invention, a normally solid polymer having a solubility of at least 0.3% (weight/volume), i.e., weight per volume percent, is dissolved in a homogeneous solvent mixture comprising (a) 10 to 75% (v./v.), chlorofluorocarbon or mixture of chlorofluorocarbon solvents having a boiling point in the range of from about 10° C. to 150° C., a melting point in the range of from about −40° C. to 125° C. (melting point being lower than boiling point), an entropy of fusion of less than 10 calories/° K./mole (heat of fusion [cal./mole]/temperature of fusion [° K.]), a plastic flow index of at least 0.1 g./10 min. at the reduced temperature of 0.96 to 0.99 (reduced temperature equals T° K. at which flow measured/T° K. of melting point; plastic flow being a measurement of the rate of extrusion as measured on a plastometer according to ASTM–D 1238–65T) and a solubility in water of less than about 2 weight percent, and (b) 25 to 90% (v./v.), cosolvent which is polar, miscible both in said chlorofluorocarbon and in water, and which is selected from the group consisting of methanol, ethanol, isopropanol, t-butanol, dimethylformamide, dimethylacetamide, dioxane, trioxane, dimethylsulfoxide, tetrahydrofuran, acetone, methylethyl ketone, hexamethyl phosphoramide, acetic acid, butyrolactone, N-methylpyrrolidone, pyridine, morpholine, methyl Cellosolve, ethyl Cellosolve, propyl Cellosolve and a mixture of any of said cosolvents. Therefore, at least 0.3 weight per volume percent of the polymer is dissolved in the selected solvent mixture. Heating may be utilized advantageously to facilitate dissolution of the polymer. This heating may also be carried out under pressure.

A polymer solution in the chlorofluorocarbon and cosolvent solvent mixture results and to this resultant solution is added water in an amount of at least 10% (v./v.) of the polymer solution. This addition takes place at a temperature below the atmospheric boiling point of the lowest boiling chlorofluorocarbon solvent or cosolvent present but greater than 0° C. This addition of water to the polymer solution causes the formation of semi-solid polymer-chlorofluorocarbon phase (i.e. essentially polymer-chlorofluorocarbon intimate mixture with trace amounts of cosolvent present) and one or more liquid phases depending upon the temperature at which the water is added. When, before water is added to the polymer solution, the polymer solution is cooled to a temperature approximately 5° C. or more below the solidification temperature of the lowest melting of the chlorofluorocarbon solvents or the cosolvents present but remains above 0° C., a very characteristic phase separation occurs: (1) a liquid phase of water and the water-soluble cosolvent and (2) a semi-solid dough-like phase which is an intimate mixture of the polymer and the chlorofluorocarbon is obtained. The amount of water required to bring about this phase separation will vary somewhat with the nature of the cosolvent used but it has been found that the volume of water added should constitute at least 10% of the volume of the polymer solution. Obviously, use of greater volume of water will result in higher efficiency in the extraction of the water-soluble cosolvent, however, the use of volume of water in excess of approximately five times the volume of the polymer solution serves no useful purpose. When the water is added at a temperature above the solidification temperature of the highest melting of the chlorofluorocarbon or the cosolvents present, but below their boiling temperature, a separation into three distinct phases takes place. The phases obtained are: (1) a liquid phase consisting of water and the water-soluble cosolvent; (2) a liquid phase consisting essentially of the chlorofluorocarbon; and (3) a semi-solid dough-like phase of the polymer and the chlorofluorocarbon (i.e., see pg. 6, lines 11–12). Because of greater versatility and the greater capacity for forming cellular structure with very high void content, the process wherein separation into two phases occurs is preferred.

The phenomenon of phase separation which occurs when water is added to the polymer solution provides important processing advantages. As an illustrative example, when 15 volumes of water are added to a solution of polyurethane in 100 volumes of a solvent mixture consisting of 50 volumes of 1,1,1,2-tetrachloro-2,2-difluoroethane and 50 volumes of dimethylformamide at a temperature of 35° C. (5 degrees below the solidification temperature of the chlorofluorocarbon used), approximately 50 volumes of the liquid phase is obtained which contains approximately 40 volumes of dimethylformamide. Thus the liquid phase contains approximately 80% of the dimethylformamide present in the original polymer solution. Since dimethylformamide is the major component of this liquid phase, it can be recovered very readily for reuse.

After these various phases are formed, as described above, the polymer-chlorofluorocarbon phase is separated out by any art-known means, e.g., decantation.

The chlorofluorocarbon is then removed from the polymer-chlorofluorocarbon semi-solid, dough-like phase which was separated out and a microporous open-celled cellular polymeric structure remains. Removal of the chlorofluorocarbon, e.g. by sublimation, at a temperature below the solidification temperature of the lowest melting chlorofluorocarbon present will leave a cellular structure with a high void content. While the temperature at which the chlorofluorocarbon sublimation is carried out can be any reasonable temperature below the solidification temperature of the chlorofluorocarbon, for greater efficiency, sublimation temperature 3° C. to 5° C. below the solidification temperature is preferred. This provides either a particulate open-celled cellular polymeric structure or a coherent microporous open-celled cellular structure of the polymer whose shape and external dimensions are essentially those of the shaped polymer-chlorofluorocarbon mixture from which it was obtained. The nature of the structure is determined by the particular polymer and polymer concentration employed.

The chlorofluorocarbon may also be separated from the semi-solid, dough-like phase of the polymer and the chlorofluorocarbon, e.g. by aspiration, at a temperature above the solidification temperature of the highest melting chlorofluorocarbon present. In this procedure, the liquid chlorofluorocarbon is aspirated first and the residual chlorofluorocarbon is vaporized away from the polymer. Aspiration of the polymer-chlorofluorocarbon phase to remove the chlorofluorocarbon generally results in a microporous structure which has lower void content than that produced by sublimation of the chlorofluorocarbon described above. The microporous open-celled cellular polymeric structure obtained may be either coherent or particulate as mentioned above.

It is also possible to prepare particulate microporous cellular structures by a slight variation in the above-described process. Preparation of particulate microporous cellular polymeric structure may be achieved by adding to the solution of the polymer in the mixed solvent of the chlorofluorocarbon and the cosolvent a surfactant in an amount up to about 3% (w./v.) of the polymer solution prior to the addition of water. Separation of the polymer-chlorofluorocarbon phase and removal of the chlorofluorocarbon solvent from this semi-solid, dough-like polymer-chlorofluorocarbon phase by sublimation or aspiration will be carried out in the same manner as described before and particulate microporous open-celled cellular structure will be obtained.

While only chlorofluorocarbons are discussed herein, it is recognized that other non-chlorofluorocarbon solvents, e.g., cyclohexane, could likewise be utilized in the process of this invention; however, they lack the efficacy manifested by chlorofluorocarbons meeting the parameters set out herein.

Polymers useful in the process of the present invention are those polymers which are normally solid and which are soluble in the solvent mixture of the chlorofluorocarbon and the cosolvent previously defined and discussed below to the extent of at least 0.3% (weight/volume). Polymer described as being addition, condensation, thermoplastic, thermoset or cross-linked is useful in this invention provided that the minimum solubility of at least 0.3% (w./v.) in the chlorofluorocarbon-cosolvent mixture can be obtained. The minimum solubility of 0.3% (w./v.) is specified because cellular structures obtained from the polymer solution of any lower concentration would be so fragile and friable as to render such material of little value and the economics of handling such dilute solution with the attendant need to remove excessive amounts of solvents would be unfavorable.

Since the void, i.e., porosity, content of the cellular structure is partially determined by the concentration of the polymer solution in the process of this invention, it is undesirable to use polymer solutions whose polymer concentration is so high as to give cellular structures with a void content of, say, less than 2%. Such cellular material while still microporous and open-celled would be almost indistinguishable from the original bulk polymer in physical properties. It is therefore preferable that the polymer concentration not exceed about 50% (w./v.).

Preferred polymers from which microporous open-celled cellular polymeric structures may be made are listed in Table I below.

TABLE I (1) polyvinylchloride
(2) polyurethane
(3) polyamide
(4) acrylonitrile-butadiene-styrene copolymer
(5) polycarbonate
(6) cellulose esters
(7) hexafluoropropylene-vinylidene difluoride copolymer
(8) ethylene-methacrylic acid copolymer
(9) ethylene-vinyl acetate copolymer
(10) polyalkyl(meth)acrylate
(11) polyvinylbutyral
(12) epoxy-polyamide
(13) polyacrylonitrile
(14) polyvinyl esters
(15) polysulfones The chlorofluorocarbon solvents useful in this invention should possess the following desirable characteristics: (1) a boiling point in the range of from about 10° C. to 150° C.; (2) a melting point in the range of from about −40° C. to 125° C. (melting point being lower than boiling point); (3) an entropy of fusion of less than 10 calories/° K./mole (heat of fusion [cal./mole]/temperature of fusion [° K.]), (4) a plastic flow index of at least 0.1 g./10 min. at the reduced temperature of 0.96 to 0.99 (reduced temperature equals T° K. at which flow measured/T° K. of melting point; plastic flow being a measurement of the rate of extrusion as measured on a plastometer according to ASTM-D 1238 65T), and (5) a solubility in water of less than about 2 weight percent.

The chlorofluorocarbons preferred of this invention include 1,1,1,2,2-pentachloro-2-fluoroethane,
1,1,2,2-tetrachloro-1,2-difluoroethane,
1,1,1,2-tetrachloro-2,2-difluoroethane,
1,1,1-trichloro-2,2,2-trifluoroethane,
1,2-dichlorodecafluorocyclohexane,
1,1,2,2-tetrachloro-perfluorocyclobutane,
1,2-dichloroperfluorocyclobutane,
1-chloroperfluorocyclobutane,
1,1,2-trichloro-1,2,2-trifluoroethane,
1,1,1,3-tetrafluoro-2,2,3,3-tetrachloropropane,
1,1,1,3,3-pentafluoro-2,2,3-trichloropropane,
1,1,1,3,3,3-hexafluoro-2,2-dichloropropane,
1,1,1,4,4,4-hexafluoro-2,2,3,3-tetrachlorobutane and mixtures thereof. The melting points and the boiling points of these chlorofluorocarbons are shown in Table II below.

TABLE II

| Chlorofluorocarbon | Melting point, ° C. | Boiling point, ° C. |
|---|---|---|
| $CCl_3$—$CCl_2F$ | 100 | 137 |
| $CCl_2F$—$CCl_2F$ | 23.5 | 92.8 |
| $CCl_3$—$CClF_2$ | 40.6 | 91.5 |
| $CCl_2F$—$CClF_2$ | −35. | 47.6 |
| $CCl_3$—$CF_3$ | 14 | 45.7 |
| $CF_3$—$CCl_2$—$CCl_2F$ | 41.7 | 112.4 |
| $CF_3CCl_2$—$CClF_2$ | −4.3 | 72 |
| $CF_3$—$CCl_2$—$CF_3$ | 3. | 33 |
| $CF_3$—$CCl_2$—$CCL_2$—$CF_3$ | 85.5 | 131–136 |
| $CF_2$—$CF_2$—$CCl_2$—$CCl_2$ (cyclic) | 84.8 | 136 |
| $CF_2$—$CF_2$—$CClF$—$CClF$ (cyclic) | −15.1 | 59.9 |
| $CF_2$—$CF_2$—$CF_2$—$CClF$ (cyclic) | −39.1 | 25.6 |
| $CF_2$—$CF_2$—$CF_2$—$CF_2$—$CClF$—$CClF$ (cyclic) | 34 | 108 |

The chlorofluorocarbons listed above have fairly narrow liquid temperature ranges. It is also of importance that these chlorofluorocarbons, when mixed, have a solidification temperature which varies linearly with the composition of the components, i.e., a eutectic is not formed. Table III below shows the solidification temperature of mixtures of $CCl_2FCCl_2F$ and $CCl_3CCF_2$ as a function of the $CCl_3CCF_2$ content of the mixture.

TABLE III $CCl_2FCCl_2F$ solvent freezing point vs. $CCl_3CClF_2$ content

| Wt. percent $CCl_3CClF_2$ | Freezing point ° C. |
|---|---|
| 0 | 26.0 |
| 10 | 27.4 |
| 20 | 28.9 |
| 30 | 30.4 |
| 40 | 31.8 |
| 50 | 33.3 |
| 60 | 34.7 |
| 70 | 36.2 |
| 80 | 37.7 |
| 90 | 39.1 |
| 100 | 40.6 |

Thus it is possible and often advantageous to use a mixture of chlorofluorocarbons in the process of this invention. The preferred chlorofluorocarbon is 1,1,1,2-tetrachloro-2,2-difluoroethane. The preferred mixture of chlorofluorocarbons is a mixture of 1,1,1,2-tetrachloro-2,2-difluoroethane and 1,1,2,2-tetrachloro-1,2-difluoroethane.

The cosolvents useful in the process of this invention are determined by the nature of the polymer which is to be dissolved in the chlorofluorocarbon solvent. The requirements of the cosolvent are (1) that it is miscible in the chlorofluorocarbon described above; (2) it is miscible in water; (3) that it is polar; and (4) when mixed with said chlorofluorocarbon, it dissolves polymers. The following cosolvents are particularly useful; methanol, ethanol, isopropanol, t-butanol, dimethylformamide, dimethylacetamide, dioxane, trioxane, dimethylsulfoxide, tetrahydrofuran, acetone, methylethyl ketone, hexamethyl phosphoramide, acetic acid, butyrolactone, N-methylpyrrolidone, pyridine, morpholine, methyl Cellosolve, ethyl Cellosolve, propyl Cellosolve and mixtures of any of these cosolvents. The choice of a particular cosolvent depends upon the particular polymer used. It is possible and often advantageous to use a mixture of above-described cosolvents.

The process of the present invention is carried out by dissolving a polymer in a homogeneous mixture of the chlorofluorocarbon and the cosolvent. The proportion of chlorofluorocarbon in the solvent mixture should be at least 10% (v./v.) and not more than 75% (v./v.) When the percentage of chlorofluorocarbon is less than 10%, the polymer-chlorofluorocarbon phase obtained after the addition of water to the polymer solution does not contain a sufficient amount of the chlorofluorocarbon to give a satisfactory microporous cellular polymeric structure. When the percentage of the chlorofluorocarbon is greater than about 75%, generally an insufficient amount of polymer is dissolved to make the process practical or economical.

The surface active agents useful in preparing particulate microporous cellular structures in the present invention are well known in the art and may be selected from the following classes:

(1) Anionic surface active agents which include, for example, fatty carboxylic acids, sulfuric esters such as sulfated alcohols and olefins, alkanesulfonic acids, and alkylarylsulfonic acids;

(2) Cationic surface active agents which include, for example, fatty amines and quaternary ammonium compounds; and (3) Nonionic surface active agents which are generally products in which a controlled number of ether or hydroxyl groups is introduced into a hydrophobic molecule such as, for example, polyoxyalkylene ethers of higher fatty alcohols and alkylphenols, e.g., octylphenoxypolyethoxyethanes.

The surface active agents to be useful in the present invention must be soluble in chlorofluorocarbon solvent. From a practical consideration, use of surface active agent much over approximately 3% (w./v.) of the polymer solution is undesirable because of (1) waste of surfactant; and (2) possible gelation of the polymer solution.

Cellular plastic materials are, of course, well known in the art and as articles of commerce. The coherent cellular materials are referred to generally as "foams" either as flexible foam or as rigid foam depending upon the physical characteristics of the cellular material. Extensive use is made of cellular polymeric materials in such applications as in insulation (thermal, sound and electrical), structural, packaging and flotation. Cellular structures prepared by the use of blowing agents either as gas or low boiling liquid dissolved in molten polymer or by the use of solids which decompose thermally generating gaseous decomposition products are characterized as having closed cells. Generally, 90–100% of the void in cellular structures prepared by above methods are composed of closed cells, each cell containing residual blowing agent. However, there are many applications of cellular materials in which vapor transmission, made possible by open-cell structure, is desirable. For example, in enclosures where humidity or internal pressures should be relieved, a portion of enclosure could advantageously be made of open-cell cellular materials.

The present invention provides a method of preparing cellular structures which are open-celled and microporous. This invention has a number of advantages over prior art methods of making cellular structures. Among these are:

(1) Excellent versatility with respect to polymers that may be used;

(2) Convenient and safe range of processing temperature such that even heat sensitive polymers (i.e. those polymers which decompose without melting) may be processed;

(3) Excellent control of void content (porosity) of cellular structures;

(4) Formation of cellular structures that are open-celled and microporous; and (5) Versatility in forming shaped cellular structures.

A very important and a valuable feature of the present invention is the semi-solid, dough-like intimate mixture of the polymer and the chlorofluorocarbon, i.e. polymer-chlorofluorocarbon phase, which is obtained when water is added to the solution of polymer in a solvent mixture of the chlorofluorocarbon and the cosolvent. This mixture is plastic, malleable and pliable and may be:

(1) Extruded, molded, or shaped into any desired shape an then converted into a cellular structure which will have the shape and the dimensions of the original semi-solid mixture;

(2) Coated on supports of various types and then converted to cellular structure thereby forming microporous, open cellular structures on supports;

(3) Layered on top of another semi-solid mixture, then converted to cellular structure thereby forming laminates of cellular structures, (4) Milled with any finely divided solid, then converting to cellular structure thereby obtaining a cellular structure with uniformly dispersed solids;

(5) Partially oriented by shearing unidirectionally or biaxially, then converting to cellular structure thereby obtaining cellular structure in which polymer is partially oriented.

While normally the process of the present invention is carried out by dissolving a polymer in a solvent mixture of a chlorofluorocarbon and a cosolvent, it is possible, if desired, to conduct polymerization in the solvent mixture and thereby arrive at a solution of polymer solvent mixture.

The process of the present invention is conveniently carried out batchwise. However, it will be readily apparent to those skilled in the art that the steps in the present invention are readily adaptable to a continuous process.

The following examples describe the invention in further detail. These examples are intended to be merely illustrative of the invention and not in limitation thereof. Unless otherwise indicated all parts are by weight.

EXAMPLES

Example 1.—Microporous open cellular polyvinyl chloride (80% void content)

A 10% (w./v.) solution of polyvinyl chloride which was insoluble in 1,1,1,2-tetrachloro-2,2-difluoroethane was prepared by stirring 20 g. of polyvinyl chloride (Eastman "Blacar" 1716) in a solvent mixture consisting of 100 ml. of 1,1,1,2-tetrachloro-2,2-difluoroethane and 100 ml. of dimethylformamide at 40° C.–50° C. The polymer solution was then cooled to 15° C.–20° C. Upon addition of 50 ml. of cold water to the cooled polymer solution with stirring, a liquid phase consisting of water and dimethylformamide and a semi-solid dough-like phase of polyvinyl chloride and 1,1,1,2-tetrachloro-2,2-difluoroethane were obtained. The liquid phase was then decanted away from polyvinyl chloride-halofluorocarbon mixture. The polyvinyl chloride-halocarbon mixture was pressed into a sheet which was then placed in a vacuum desiccator. Vacuum was applied to sublime tetrachlorodifluoroethane away from the mixture. After removal of the tetrachlorodifluoroethane, a white sheet of a coherent, microporous cellular structure of polyvinyl chloride remained which retained the shape and the dimension of the original sheet. Dioxane, trioxane, dimethylacetamide and dimethylsulfoxide may also be used as cosolvent with tetrachloroifluoroethane for polyvinyl chloride. In order to hasten sublimation of the halofluorocarbon, means to maintain the temperature of polymer halofluorocarbon mixture in the range of 0° C.–35° C. may be used, if desired. As is common in most sublimation procedures, means to trap solvent vapor such as a cold trap may also be used to increase the efficiency of sublimation and to recover the solvent.

Example 2.—Microporous open cellular polyvinyl chloride (~40% void content)

The procedure of Example 1 was repeated. After addition of water and separation of the water-dimethylformamide phase, the polymer-tetrachlorodifluoroethane mixture was rolled into a sheet. The sheet was placed in warm water (>42° C.) and most of the molten tetrachlorodifluoroethane was separated. Removal of the residual halofluorocarbon from the resultant polyvinyl chloride-halofluorocarbon sheet was effected by sublimation as in Example 1 and yielded a rigid microporous sheet of polyvinyl chloride with a void content of ~40%.

Example 3.—Microporous open cellular polyurethane (void content ~80%)

A 10% (w./v.) solution of polyurethane which was insoluble in 1,1,1,2-tetrachloro-2,-difluoroethane ("Estane" 5701 B.F. Goodrich) was obtained by stirring 20 g. of polyurethane in a solvent mixture of 100 ml. of 1,1,1,2-tetrachloro-2,2-difluoroethane and 100 ml. of dimethylformamide at 40° C.–50° C. After the solution was cooled to about 10° C., a viscous, tan liquid solution was obtained. Upon addition of 20 ml. of ice-cold water with stirring, a liquid phase consisting of water and dimethylformamide and a semi-solid, dough-like phase of polyurethane and tetrachlorodifluoroethane were obtained. The liquid phase was poured off and the semi-solid dough-like mixture of polyurethane and halofluorocarbon was rolled into a thin sheet of 0.05 to 0.1 inch thickness at a temperature below the solidification temperature of the halofluorocarbon (40° C.) Removal of halofluorocarbon as described in Example 1 afforded a soft, very flexible microporous open cellular sheet of polyurethane with a void content of about 80%. Dioxane, trioxane, dimethylacetamide and dimethylsulfoxide may also be used as cosolvent for the solution of polyurethane in halofluorocarbon cosolvent mixture.

Example 4.—Microporous open cellular polyurethane sheet (void content ~40%)

The dough-like semi-solid mixture of polyurethane and 1,1,1,2-tetrachloro - 2,2 - difluoroethane, obtained as described in Example 3, was warmed to a temperature of about 42° C., to melt the tetrachlorodifluoroethane, and was then pressed with warm rollers. The halofluorocarbon was then removed from the thin sheet (0.05 to 0.1 inch thickness) as described in Example 1. The polyurethane sheet thus obtained had the texture and feel of a soft leather. Such sheets are drapable, with water vapor permeability value of around 6,000 compared with leather which has water vapor permeability value of 7–10,000. Water vapor permeability also referred to as LPV or Leather Permability Value is determined as follows: The sheet, for which the permeation value is to be determined, is placed over the mouth of a Payne cup, which is a circular container and has an opening of 10 square centimeters, so that the opening is completely covered. The Payne cup contains 9 g. of desiccant, calcium chloride. The covered cup is weighed and placed in an environment of 90% relative humidity for 24 hours. After exposure the cup is weighed again and the gain in weight represents the weight of water vapor transmitted through the test sheet over 10 square centimeters over 24 hours. Water vapor permeation values are then expressed in terms of grams of water vapor transmitted per hour per 100 square meters of surface area. Water vapor permeation value may also be determined by placing in the Payne cup, water instead of the desiccant, and then exposing the covered cup to an environment of low relative humidity (10%) and determining the loss in weight of the cup after 24 hours. The loss in weight represents the amount of water in the cup which vaporized and was transmitted through 10 square centimeters of test membrane in 24 hours. The water vapor permeation value may again be expressed in terms of grams of water permeated per hour per 100 square meters of surface area. The polyurethane sheet thus obtained has high tear-strength, comparable to that of leather. This surprising increase in tear-strength is unexpected since in artificially-made permeable sheet structures, fibrous element such as felt or woven fabric is required to achieve such high tear-strengths.

Example 5.—Microporous open cellular polyamide sheet

A 5% solution (w./v.) of polyamide which was insoluble in 1,1,1,2-tetrachloro-2,2-difluoroethane (Du Pont "Zytel" 63) was obtained by stirring 5 g. of polyamide in a solvent mixture comprising 500 ml. methanol and 500 ml. 1,1,1,2-tetrachloro-2,2-difluoroethane at 40° C.–50° C. The polymer solution was then cooled to approximately 15° C.–20° C. and stirred into 500 ml. of ice-cold water. The heavy, white, dough-like precipitate was collected on a filter, and pressed into a thin sheet. Removal of halofluorocarbon as described in Example 1 resulted in a tough, white, microporous open cellular permeable sheet of polyamide which was plasticized but not collapsed by water.

Example 6.—Particulate microporous open cellular polyamide

A 5% solution (w./v.) of polyamide (Du Pont "Zytel" 63 Copolymer) was obtained by stirring 5 g. of polyamide in a solvent mixture comprising 50 ml. of methanol and 50 ml. of 1,1,1,2-tetrachloro-2,2-difluoroethane at 40° C.–50° C. Octylphenoxypolyethoxyethanol ("Triton" X–100, Rohm and Haas), 1 g., was added to the above solution and the solution was then cooled to about 35° C. and 300 ml. of ice-cold water was added with stirring, to give a grainy, white suspension. The water-methanol phase was removed by filtration. Removal of the halofluorocarbon from the intimate mixture of polyamide and halofluorocarbon as described in Example 1 left a fine white fluffy microporous polyamide powder.

Example 7.—Microporous open cellular sheet of acrylonitrile-butadiene-styrene copolymer A 10% solution (w./v.) of acrylonitrile-butadiene-styrene copolymer which was insoluble in 1,1,1,2-tetrachloro-2,2-difluoroethane ("Cycolac" X–7 Marbon Chem. Div., Borg Warner) was obtained by stirring 25 g. of the copolymer in a solvent mixture comprising 125 ml. 1,1,1,2-tetrachloro-2,2-difluoroethane and 125 ml. of dimethylformamide at 40° C.–50° C. A solution with slight turbidity was obtained. This solution was cooled to approximately 15° C.–20° C. and then stirred into 100 ml. of ice-cold water. A semi-solid, dough-like mixture of the copolymer and the halofluorocarbon was obtained after decantation of the water-dimethylformamide phase. The intimate mixture of the copolymer and the halofluorocarbon was pressed into a thin sheet. The halofluorocarbon was then removed as described in Example 1 giving a rather stiff, microporous open cellular sheet of acrylonitrile-butadiene-styrene copolymer. Other cosolvents such as dimethylacetamide and dimethylsulfoxide may also be used.

Example 8.—Microporous open cellular polycarbonate sheet

A 10% (w./v.) solution of aromatic polycarbonate which was insoluble in 1,1,1,2-tetrachloro-2,2-difluoroethane ("Lexan" 101, General Electric) was prepared by stirring 25 g. of polycarbonate in a solvent mixture comprising 125 ml. of dimethylformamide and 125 ml. of 1,1,1,2-tetrachloro-2,2-difluoroethane at 40° C.–50° C. The solution was then cooled to approximately 15° C.–20° C. Addition of 50 ml. of cold water to the cooled polymer solution gave a liquid water-dimethylformamide phase which was decanted from the dough-like mixture of polycarbonate and tetrachlorodifluoroethane. The polymerhalofluorocarbon mixture was pressed into a thin sheet and upon removal of the halofluorocarbon as described in Example 1, microporous, open cellular polycarbonate sheet was obtained.

Example 9.—Microporous open cellular polycarbonate sheet of higher density

A higher density cellular sheet of polycarbonate was obtained when the above-described polycarbonate-halofluorocarbon mixture was warmed to a temperature above the melting point of the halofluorocarbon and then pressed into a thin sheet. The molten halofluorocarbon was expressed from the mixture and separated from the pressed sheet. Residual halofluorocarbon was then removed from the polycarbonate by sublimation as described in Example 1. Alternatively, the halofluorocarbon could be aspirated by placing on a vacuum filter, such as Buchner funnel.

Example 10.—Microporous open cellular vinyl chloride-vinyl acetate copolymer A 20% solution (w./v.) of polyvinyl chloride-vinyl acetate copolymer which was slightly soluble in 1,1,1,2-tetrachloro-2,2-difluoroethane ("Geon" 427, B. F. Goodrich) was prepared by stirring 40 g. of the polymer in a solvent mixture comprising 100 ml. of acetone and 100 ml. of 1,1,1,2-tetrachloro-2,2-difluoroethane at 40° C.–50° C. The polymer solution was then cooled to around 15° C.–20° C. and poured with stirring into 1000 ml. of ice-cold water thereby yielding a heavy, stiff, grainy mixture of the polymer and the tetrachlorodifluoroethane. The polymer-halofluorocarbon mixture was separated by filtration and pressed into a thin sheet. Removal of halofluorocarbon by sublimation as described in Example 1 gave a white, microporous, open cellular sheet of polyvinyl chloride copolymer. Other useful cosolvents include dioxane, dimethylacetamide, dimethylformamide and tetrahydrofuran.

Example 11.—Particulate microporous open cellular vinyl chloride-vinyl acetate copolymer 100 ml. of 20% solution of vinyl chloride copolymer prepared as described in Example 10 was diluted with 100 ml. of the solvent blend comprising 50 ml. of acetone and 50 ml. of 1,1,1,2-tetrachloro-2,2-difluoroethane and in which 1 g. of octylphenoxypolyethoxyethanol ("Triton" X–100, Rohm and Haas) had been dissolved. The solution was then cooled to around 15° C.–20° C. and 200 ml. of cold water was added with stirring to yield a white fine-grained suspension. The whole mixture was filtered on a Buchner funnel. The aqueous layer was quickly filtered off, leaving a damp heavy powder. Continued aspiration yields a very fine fluffy microporous powder of the copolymer.

Example 12.—Microporous open cellular cellulose acetate

Coherent microporous open cellular cellulose acetate and particulate microporous open cellular cellulose acetate were prepared as described in Example 10 and 11 after dissolution of cellulose acetate in a solvent mixture comprising equal volumes of acetone and 1,1,1,2-tetrachloro-2,2-difluoroethane.

Example 13.—Microporous open cellular structure of hexafluoropropylene-vinylidene difluoride copolymer A 10% solution of hexafluoropropylene-vinylidene difluoride copolymer which was only slightly soluble in 1,1,1,2-tetrachloro-2,2-difluoroethane ("Viton" A, Du Pont) was prepared by stirring 20 g. of the polymer in a solvent mixture comprising 100 ml. of acetone and 100 ml. of 1,1,1,2-tetrachloro-2,2-difluoroethane at 40° C.–50° C. The solution thus obtained had slight turbidity and was slightly viscous. The solution was then cooled to around 35° C. and upon addition of 100 ml. of cold water, a liquid phase of water and acetone and a semi-solid dough-like phase of the polymer and the halofluorocarbon were obtained. The mixture of polymer and halofluorocarbon left after decantation of the water-acetone phase was pressed into a thin sheet and after removal of the halofluorocarbon by sublimation as described in Example 1, a soft, pliable microporous open cellular sheet of hexafluoropropylene-vinylidene difluoride copolymer was obtained.

Example 14.—Particulate microporous open cellular ethylene-methacrylic acid copolymer A 10% solution of ethylene-methacrylic acid copolymer which was only slightly soluble in 1,1,1,2-tetrachloro-2,2-difluoroethane ("Surlyn" RX 3933, Du Pont) was prepared by refluxing (82° C.–88° C.) 25 g. of the polymer in a solvent mixture comprising 150 ml. of 1,1,1,2-tetrachloro-2,2-difluoroethane and 100 ml. of isopropanol to give a clear viscous solution. (It is to be noted that ethylene-methacrylic acid copolymer is insoluble in either tetrachlorodifluoroethane or isopropanol singularly but is soluble in a mixture of these solvents.) The polymer solution was cooled to approximately 15° C.–20° C. while stirring. Ice-cold water (250 ml.) was then added with stirring. A grainy mixture of the polymer and the halofluorocarbon resulted which was then separated by filtration on a Buchner funnel. Continued aspiration on the Buchner funnel resulted in the removal of the halofluorocarbon leaving behind a white microporous powder of approximately 100 mesh which if desired could be ground finer. If a surfactant is added to the polymer solution prior to the addition of water, the resultant microporous powder obtained is of much finer size (200 mesh).

Example 15.—Particulate microporous open cellular ionically cross-linked ethylene-methacrylic acid copolymer A solution of ionically cross-linked ethylene-methacrylic acid copolymer which had only slight solubility in 1,1,1,2-tetrachloro - 2,2 - difluoroethane ("Surlyn" 1650 Du Pont) was obtained by refluxing (82° C.–85° C.) 25 g. of the polymer in a solvent mixture comprising 125 ml. of isopropanol and 250 ml. of 1,1,1,2-tetrachloro-2,2-difluoroethane and 10 ml. of nitromethane. (The function of nitromethane is to prevent the loss of metallic cation which serves as a cross-linking agent from the polymer.) The polymer solution was cooled to 15° C.–20° C. with stirring. Ice-water (400 ml.) was then added to the cooled polymer solution with stirring to give a thick white paste. This was filtered on a Buchner funnel and then aspirated overnight to give a white, microporous fine powder of the polymer.

Example 16.—Particulate microporous open cellular structure of hydrolyzed ethylene-vinyl acetate copolymer A 10% solution of hydrolyzed ethylene-vinyl acetate copolymer which had only slight solubility in 1,1,1,2-tetrachloro-2,2-difluoroethane ("Elvon" Du Pont) was prepared by refluxing 20 g. of the polymer at 82° C.–85° C. in a solvent mixture comprising 100 ml. of isopropanol and 100 ml. of 1,1,1,2-tetrachloro-2,2-difluoroethane. The solution was cooled with stirring to 10° C.–15° C. Addition of 200 ml. of ice-cold water with stirring gave a thick, white, doughy paste. Filtration and aspiration of the cold paste give a fine white microporous powder of the polymer. Addition of surfactant to the polymer solution prior to cooling and addition of water would give finer size powder (less than 200 mesh).

The coherent open-celled polymeric structures made by the process of the present invention can be used in many applications such as insulating materials in areas of low humidity and low internal pressures; in poromeric materials in which vapor penetration is important, e.g., as a heat-insulating layer of a synthetic shoe-upper material; in synthetic sponges and other articles which must be able to absorb large quantities of water or other liquids; and in speciality filters.

The particulate open-celled polymeric structures made by the process of the present invention can find application in areas where highly absorbent, large surface area powders are used. The applications include: materials for column, gas and thin layer chromatography; desiccating powders; and filtration adjuvants.

This detailed description has been given for clarity of understanding only and no unnecessary limitations are to be understood therefrom. The invention is not limited to exact details shown for obvious modifications will occur to one skilled in the art.

The embodiments of the invention in which an exclusive property or privilege is claimed are defined as follows:

1. A process for preparing microporous, open-celled cellular polymeric structures which comprises:
   (a) dissolving at least 0.3 grams per 100 ml. of solvent of a normally solid polymer in a homogeneous solvent mixture of
      (i) from about 10 to about 75 volume percent of a liquid chlorofluorocarbon solvent or mixture of chlorofluorocarbon solvents having a boiling point in the range of from about 10° C. to 150° C., a melting point in the range of from about −40° C. to 125° C., an entropy of fusion of less than 10 calories/° K./mole, a plastic flow index of at least 0.1 g./10 min. at the reduced temperature of 0.96 to 0.99, a solubility in water of less than about 2 weight percent, and
      (ii) from about 90 to about 25 volume percent of a cosolvent selected from the group consisting of methanol, ethanol, isopropanol, t-butanol, dimethylformamide, dimethylacetamide, dioxane, trioxane, dimethylsulfoxide, tetrahydrofuran, acetone, methylethyl ketone, hexamethyl phosphoramide, acetic acid, butyrolactone, N - methylpyrrolidone, pyridine, morpholine, methyl "Cellosolve," ethyl "Cellosolve," propyl "Cellosolve," and mixtures thereof, to form polymer solution, said polymer having a solubility of at least 0.3 grams per 100 ml. in said solvent mixture;
   (b) adding at least 10 volume percent of water to said polymer solution, the temperature of said solution being greater than 0° C. but below the atmospheric boiling point of the lowest boiling of the chlorofluorocarbon solvents or selected cosolvents present, to form a polymer-chlorofluorocarbon phase and at least one other phase;
   (c) separating out the polymer-chlorofluorocarbon phase; and
   (d) removing the chlorofluorocarbon from the separated polymer-chlorofluorocarbon phase.

2. A process according to claim 1 wherein the chlorofluorocarbon or mixture of chlorofluorocarbons is selected from the group consisting of
1,1,1,2,2-pentachloro-2-fluoroethane,
1,1,2,2-tetrachloro-1,2-difluoroethane,
1,1,1,2-tetrachloro-2,2-difluoroethane,
1,1,1-trichloro-2,2,2-trifluoroethane,
1,2-dichlorodecafluorocyclohexane,
1,1,2,2-tetrachloro-perfluorocyclobutane,
1,2-dichloroperfluorocyclobutane,
1-chloroperfluorocyclobutane,
1,1,2-trichloro-1,2,2-trifluoroethane,
1,1,1,3-tetrafluoro-2,2,3,3-tetrachloropropane,
1,1,1,3,3-pentafluoro-2,2,3-trichloropropane,
1,1,1,3,3,3-hexafluoro-2,2-dichloropropane,
1,1,1,4,4,4-hexafluoro-2,2,3,3-tetrachlorobutane
and mixtures thereof.

3. A process according to claim 1 wherein the temperature of the said polymer solution in claim 1(b) is greater than 0° C. but below the solidification temperature of the lowest melting of the chlorofluorocarbon solvents or selected cosolvents present.

4. A process according to claim 1 wherein the temperature of the said polymer solution in claim 1(b) is greater than the solidification temperature of the highest melting of the chlorofluorocarbon solvents or selected cosolvents present but below the atmospheric boiling point of the lowest boiling of the chlorofluorocarbon solvents or selected cosolvents present.

5. A process according to claim 1 wherein from 0.3 to about 50 grams per 100 ml. of solvent of a normally solid polymer is dissolved in the solvent mixture.

6. A process according to claim 3 wherein from 0.3 to about 50 grams per 100 ml. of solvent of a normally solid polymer is dissolved in the solvent mixture.

7. A process according to claim 4 wherein from 0.3 to about 50 grams per 100 ml. of solvent of a normally solid polymer is dissolved in the solvent mixture.

8. A process according to claim 1 wherein the chlorofluorocarbon is removed from the polymer-chlorofluorocarbon phase by sublimation, at a temperature below the solidification temperature of the lowest melting chlorofluorocarbon present.

9. A process according to claim 8 wherein the sublimation takes place at a temperature of from 3° C. to 5° C. below the solidification temperature of the lowest melting chlorofluorocarbon present.

10. A process according to claim 3 wherein the chlorofluorocarbon is removed from the polymer-chlorofluorocarbon phase by sublimation, at a temperature below the solidification temperature of the lowest melting chlorofluorocarbon present.

11. A process according to claim 4 wherein the chlorofluorocarbon is removed from the polymer-chlorofluorocarbon phase by sublimation, at a temperature below the solidification temperature of the lowest melting chlorofluorocarbon present.

12. A process according to claim 1 wherein the chlorofluorocarbon is removed from the polymer-chlorofluorocarbon phase by aspiration, at a temperature above the solidification temperature of the highest melting chlorofluorocarbon present.

13. A process according to claim 3 wherein the chlorofluorocarbon is removed from the polymer-chlorofluorocarbon phase by aspiration, at a temperature above the solidification temperature of the highest melting chlorofluorocarbon present.

14. A process according to claim 4 wherein the chlorofluorocarbon is removed from the polymer-chlorofluorocarbon phase by aspiration, at a temperature above the solidification temperature of the highest melting chlorofluorocarbon present.

15. A process according to claim 1 further comprising adding to the polymer solution of claim 1(a) up to about 3 grams per 100 ml. of solvent of a chlorofluorocarbon-miscible anionic, cationic, or nonionic surface active agent prior to the addition of the water in claim 1(b).

16. A process according to claim 1 wherein the chlorofluorocarbon solvent of claim 1(a) is 1,1,1,2-tetrachloro-2,2-difluoroethane.

17. A process according to claim 1 wherein the chlorofluorocarbon solvent of claim 1(a) is a mixture of 1,1,1,2-tetrachloro-2,2-difluoroethane and 1,1,2,2-tetrachloro-1,2-difluoroethane.

18. A process according to claim 15 wherein the surface active agent is anionic and is selected from the group consisting of fatty carboxylic acids, sulfuric esters, alkane sulfonic acids and alkylarylsulfonic acids.

19. A process according to claim 15 wherein the surface active agent is cationic and is selected from the group consisting of fatty amines and quaternary ammonium compounds.

20. A process according to claim 15 wherein the surface active agent is nonionic and is selected from the group consisting of polyoxyalkylene ethers of higher fatty acids and alkylphenols.

21. A process according to claim 1 wherein the amount of chlorofluorocarbon used is such that the resulting polymeric microporous, open-celled, cellular, structure is coherent.

22. A process according to claim 1 wherein the amount of chlorofluorocarbon used is such that the resulting polymeric microporous, open-celled, celluar, structure is particulate.

23. A plastic, pliable, malleable, semi-solid, dough-like intimate mixture of a polymer in a selected chlorofluorocarbon prepared by
(a) dissolving at least 0.3 grams per 100 ml. of solvent of a normally solid polymer in a homogeneous solvent mixture of
  (i) from about 10 to about 75 volume percent of a liquid chlorofluorocarbon solvent or mixture of chlorofluorocarbon solvents having a boiling point in the range of from about 10° C. to 150° C., a melting point in the range of from about −40° C. to 125° C., an entropy of fusion of less than 10 calories/° K./mole, a plastic flow index of at least 0.1 g./10 min. at the reduced temperature of 0.96 to 0.99, a solubility in water of less than about 2 weight percent, and
  (ii) from about 90 to about 25 volume percent of a cosolvent selected from the group consisting of methanol, ethanol, isopropanol, t-butanol, dimethylformamide, dimethylacetamide, dioxane, trioxane, dimethylsulfoxide, tetrahydrofuran, acetone, methylethyl ketone, hexamethyl phosphoramide, acetic acid, butyrolactone, N-methylpyrrolidone, pyridine, morpholine, methyl "Cellosolve," ethyl "Cellosolve," propyl "Cellosolve," and mixtures thereof, to form polymer solution, said polymer having a solubility of at least 0.3 grams per 100 ml. in said solvent mixture;
(b) adding at least 10 volume percent of water to said polymer solution, the temperature of said solution being greater than 0° C. but below the atmospheric boiling point of the lowest boiling of the chlorofluorocarbon solvents or selected cosolvents present, to form a polymer-chlorofluorocarbon phase and at least one other phase; and
(c) separating out the polymer-chlorofluorocarbon phase.

24. A product according to claim 23 wherein the chlorofluorocarbon or mixture of chlorofluorocarbons is selected from the group consisting of 1,1,1,2,2-pentachlro-2-fluoroethane,
1,1,2,2-tetrachloro-1,2-difluoroethane,
1,1,1,2-tetrachloro-2,2-difluoroethane,
1,1,1-trichloro-2,2,2-trifluoroethane,
1,2-dichlorodecafluorocyclohexane,
1,1,2,2-tetrachloro-perfluorocyclobutane,
1,2-dichloroperfluorocyclobutane,
1-chloroperfluorocyclobutane,
1,1,2-trichloro-1,2,2-trifluoroethane,
1,1,1,3-tetrafluoro-2,2,3,3-tetrachloropropane,
1,1,1,3,3-pentafluoro-2,2,3-trichloropropane,
1,1,1,3,3,3-hexafluoro-2,2-dichloropropane,
1,1,1,4,4,4-hexafluoro-2,2,3,3-tetrachlorobutane and mixtures thereof.

References Cited
UNITED STATES PATENTS
| | | | |
|---|---|---|---|
| 3,585,149 | 6/1971 | Vassiliades et al. | 260—2.5 B |
| 3,491,032 | 1/1970 | Skochdopole et al. | 260—2.5 E |
| 3,378,507 | 4/1968 | Sargent et al. | 260—2.5 M |

FOREIGN PATENTS
| | | | |
|---|---|---|---|
| 2,017,904 | 11/1970 | Germany | 260—2.5 M |

MURRAY TILLMAN, Primary Examiner

W. J. BRIGGS, SR., Assistant Examiner

U.S. Cl. X.R.

106—122; 161—159, 254; 210—500; 260—2.5 B, M, HA, HB, 2.5 N, F, EP, H, 2.5 AE, BD, L, 18 EP, 23 H, S, XA, 29.2 TN, EP, R, 29.2 N, 29.6 F, MP, MQ, MN, 30.2, 30.4 N, R, 30.6 R, 30.8 DS, 31.2 R, 32.6 R, N, 32.8 R, N, EP, 33.4 EP, R, UB, UA, 33.8 F, EP, R, 33.8 UA, UB; 264—46, 49